Sept. 17, 1963  G. L. GRANT  3,104,367
TOLL SYSTEM FOR HIGHWAYS
Filed Feb. 21, 1958  5 Sheets-Sheet 1

Inventor
Gardner L. Grant
by Roberts, Cushman & Grover
Attys

Inventor
Gardner L. Grant
by Roberts, Cushman & Grover
Attys

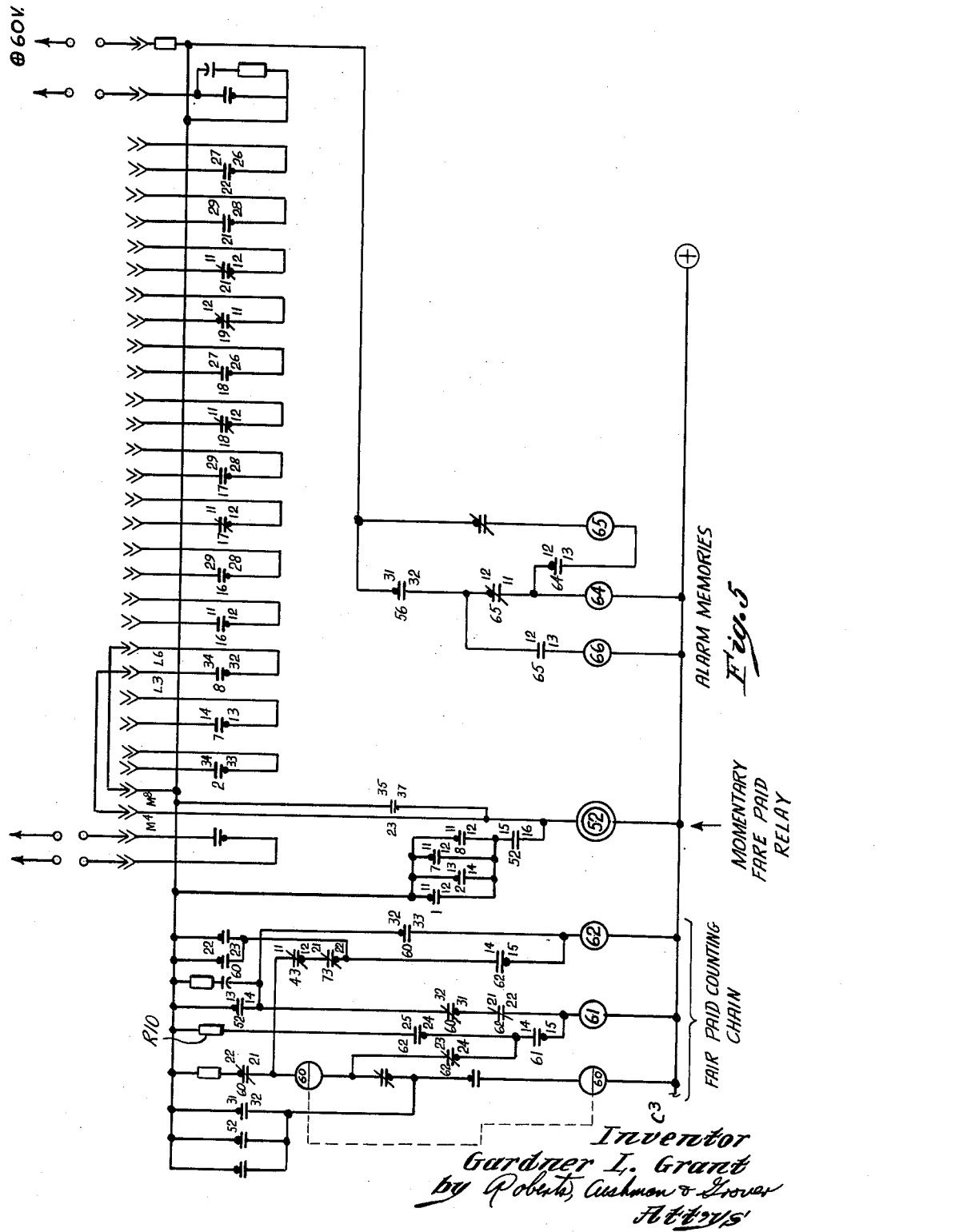

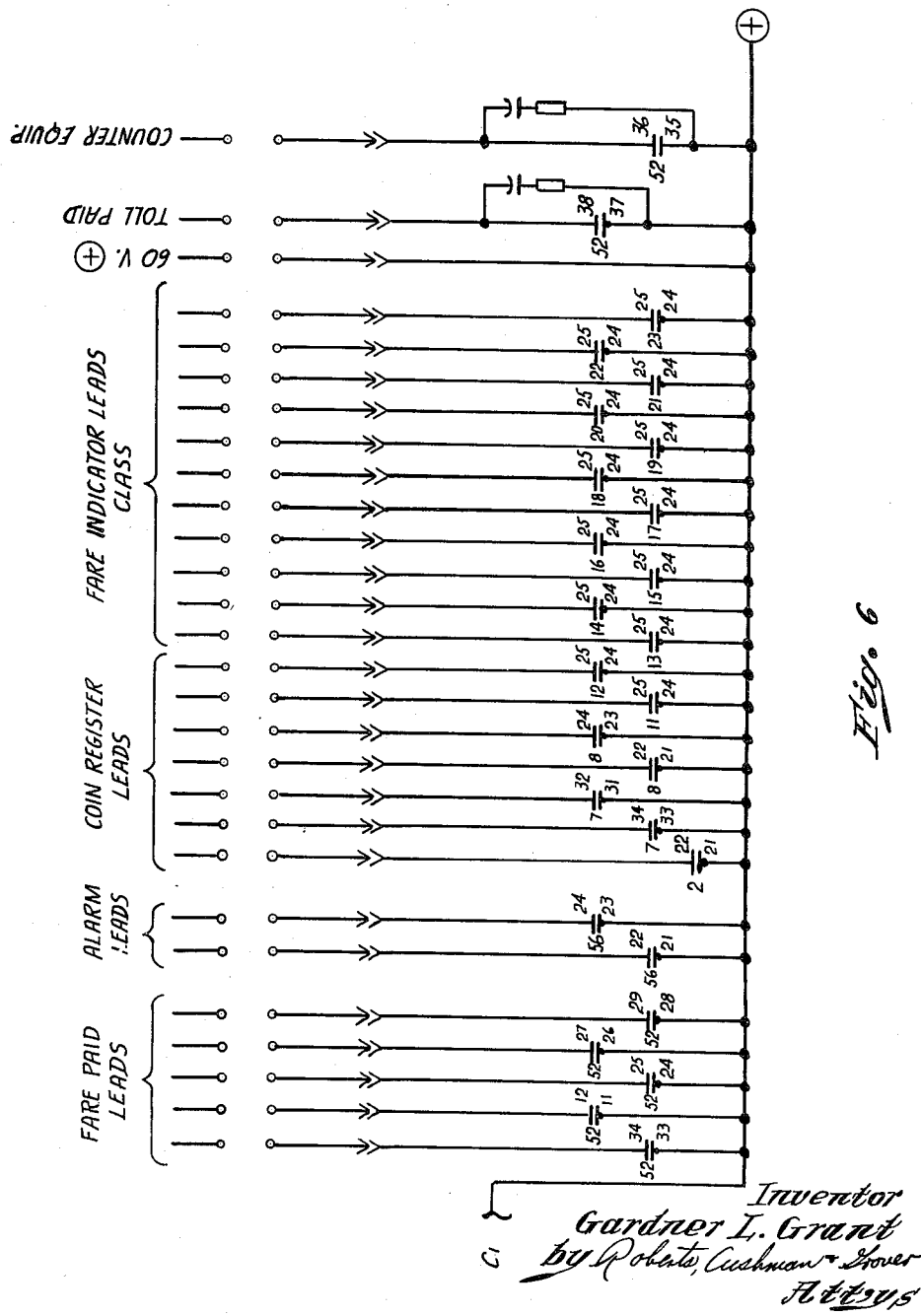

United States Patent Office 3,104,367
Patented Sept. 17, 1963

3,104,367
TOLL SYSTEM FOR HIGHWAYS
Gardner L. Grant, Providence, R.I., assignor, by mesne assignments, to Universal Controls, Inc., New York, N.Y., a corporation of Maryland
Filed Feb. 21, 1958, Ser. No. 716,623
19 Claims. (Cl. 340—31)

This invention relates to a toll collection system and has for its principal objects to provide a system which will not require attendants, which is especially adapted for collecting toll fares for a single class of vehicles, all of which are required to pay the same toll, the amount of which may desirably be different for different times of the day or days of the week for the purpose of controlling the flow or the character of the flow of traffic, to provide a system which will receive the toll whether it is made up of a single coin representing the entire amount of the toll or a plurality of mixed coins, to provide a system which will signify to the operator of each vehicle, after the deposit has been made, the amount of his deposit and that he is to proceed, to provide a system which will not be adversely affected by vehicles following one another in abnormally close succession, to provide a system which will actuate an alarm when a vehicle passes through without paying the required toll or too little toll, to provide a system which will clear the coin registering means of bent coins, slugs, foreign matter, and the like, only after the registering means has failed for example the second time in succession to give a fare-paid signal, to provide a system which will count the total number of axles passing and the number of the violation vehicles and/or axles passing, to provide a system which will count the number of fares paid, their make-up and their classification, and to provide a system in which some or all of the foregoing information may be transferred to an administration or control building.

As herein illustrated, there are means in the form of coin collecting and registering apparatus at the toll station for receiving the toll paid in the form of a single coin or mixed coins of different denominations, for identifying each coin in the deposit, adding the coins up and producing a fare or toll paid signal only when the correct amount has been deposited and to visibly indicate the amount paid. Since it may be desirable to change the amount of the toll for different occasions there is means which may be manually adjusted to cause the system to respond to different amounts of toll. Beyond the coin collecting and registering apparatus there is an indicator which is visible to the driver of the vehicle which normally exhibits a "stop" signal. This indicator is operable by a fare-paid signal originating from the registering apparatus to change the indicator signal from "stop" to "go," thereby to signify to the driver that he may proceed. There are means operable by the vehicle as it departs from the station to change the indicator signal back to "stop," so that the next vehicle is confronted by a "stop" signal and will be required to make a deposit before it is permitted to proceed. This vehicle-operated means may be located at whatever place is most expedient to producing a smooth flow of traffic. If there is a heavy flow of traffic in which the vehicles follow each other abnormally close a condition may arise in which a succeeding toll will have been deposited before the preceding vehicle reaches the means for restoring the "go" signal to "stop." If this happens, when the preceding vehicle operates the aforesaid means the signal will change from "go" to "stop" and consequently the following vehicle will be confronted with a "stop" signal even though the required toll has been paid. Accordingly, there is means for storing up two fare-paid payments in succession and for preventing the "go" signal from changing from "go" to "stop" until the second vehicle passes, if this circumstance arises. It may also occur that a vehicle, not making a payment, will be apprehended after passing beyond the aforesaid vehicle operated means. If such is the case and the fare is then paid, the departing vehicle will not actuate the vehicle operated means, hence a signal will continue to indicate "go" until some following vehicle, by failing to pay and proceeding beyond the vehicle operated means, turns the signal from "go" back to "stop." Accordingly, there is signal reversing means for automatically restoring the signal to "stop" after a predetermined interval. In order to act as a check on the deposited toll, the means operable by departure of the vehicle from the station is designed to count the axles of each vehicle and if they correspond in number to the permitted number of axles, to effect the change of the signal from "go" to "stop," and to return the system to its initial condition. This means is operative in the event of non-payment, to produce an alarm, and in the event of failure of the apparatus to give a fare-paid signal twice in succession, such as may be caused by the presence of obstructions, such as bent coins, foreign matter, slugs or foreign coins, to open a scavenger door in the coin collecting apparatus, so as to discharge the aforesaid obstructing material into a vault. There are also means operative to swing the scavenger door open if the electric power fails or the registering apparatus becomes jammed or inoperative for any reason, to allow all coins deposited thereafter automatically to pass into the vault. The vehicle-operated means is a treadle, and depression of the treadle operates a counter each time it is depressed to count the total number of vehicles and axles that pass over it. There is a second counter also operable by depression of the treadle but only when no fare has been paid, so as to count only the number of axles passing for which no fare has been paid. In addition to the foregoing there is counting means operable by the fare-paid signal to record the number of transactions, the denomination of coins paid and the classification of fares paid.

The invention will now be described in greater detail with reference to the accompanying drawings wherein:

FIGS. 3, 4, 5 and 6 are diagrammatic views of the circuits for operating the system.

Figure 1:
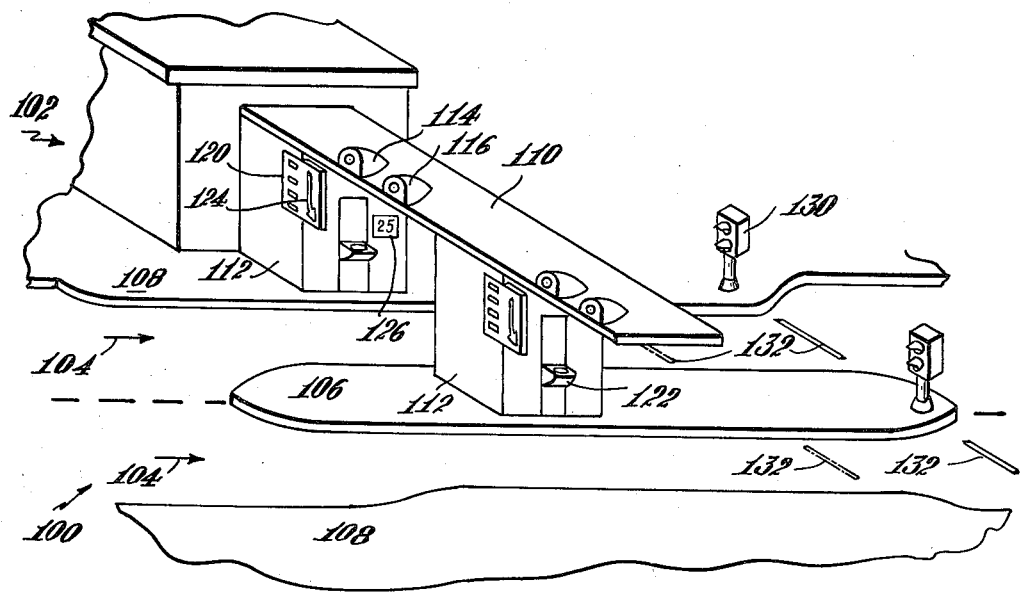
FIG. 1 is a perspective view of a multi-lane highway showing a toll station of the kind which has individual booths at opposite sides of a lane for housing a coin collecting apparatus and an attendant.
Figure 1A:
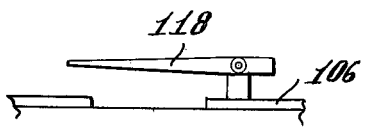
FIG. 1a is an elevation of a gate which may optionally be employed to block a lane.

Referring to the drawings, there is shown in FIG. 1 a section of a highway 100, in which there is a toll station 102. The traffic is illustrated as moving in one direction, from left to right, through the station along lanes 104, separated by a center island 106, and bounded on their outsides by islands 108. It is, of course, obvious that the number of lanes may be multiplied by adding islands where the road is wider, and hence a greater number of lanes, and that where the traffic flows in both directions some of the lanes may be used for traffic flowing in one direction and some for those flowing in the opposite direction. Preferably the entrance and departure ends of the island are flared to assist in guiding traffic into the lanes. About midway between the ends of the center island 106 there is an overhead, horizontally disposed, permanently installed canopy 110 supported by toll booths 112, erected on the islands. Between the toll booths there are fastened to the canopy, directly above each lane, red and green lights 114 and 116, each provided with a suitable hood to confine its beam to the path of the motorist approaching in that particular lane. These lights will be electrically controlled from a supervisory control tower or an administration building to which all of the stations along the highway are connected, so that they may be turned on or off depending upon what lanes are to be used.

When turned on the red lights are provided to show that the lanes over which they appear are closed to traffic while the green lights are intended to show that the lanes are open to traffic.

In addition to the red and green lights, traffic gates may be placed at the entrance to each lane. Such gates 118 may be mounted on the island and electrically controlled from the aforesaid administration building so that they cannot be opened except by a signal from the administration building plus a key used by the attendant at the station.

The booths on the islands have toll fare indicating means 120 to designate the fare required, toll collecting hoppers 122 into which the coin or coins making up the toll may be tossed, arrows 124 pointing to the hoppers, and indicators 126 to show how much fare has been deposited. The toll booths on the center island have collecting hoppers and fare indicating means at both sides. This makes it possible for the motorist to make his deposit from either side of the vehicle. Each booth contains fare recording apparatus, means for conditioning the system to receive toll fares of a given amount for a given classification of vehicles and means operative upon payment or non-payment to give an appropriate signal.

Figure 2:
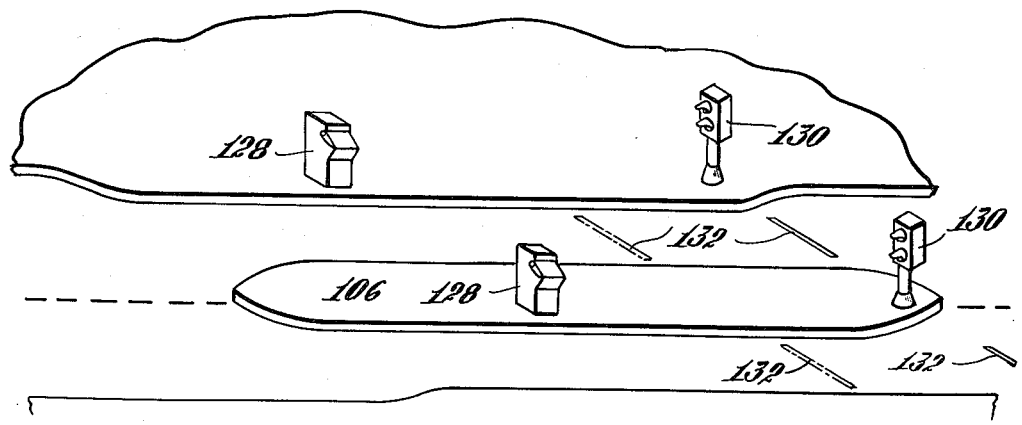
FIG. 2 is a perspective view of a toll station of the unattended kind.

The canopy and booths may be omitted, as shown in FIG. 2, and, instead, free-standing collecting apparatus 128 may be employed. The free-standing apparatus is intended for use where attendants are not necessary.

Figure 3:
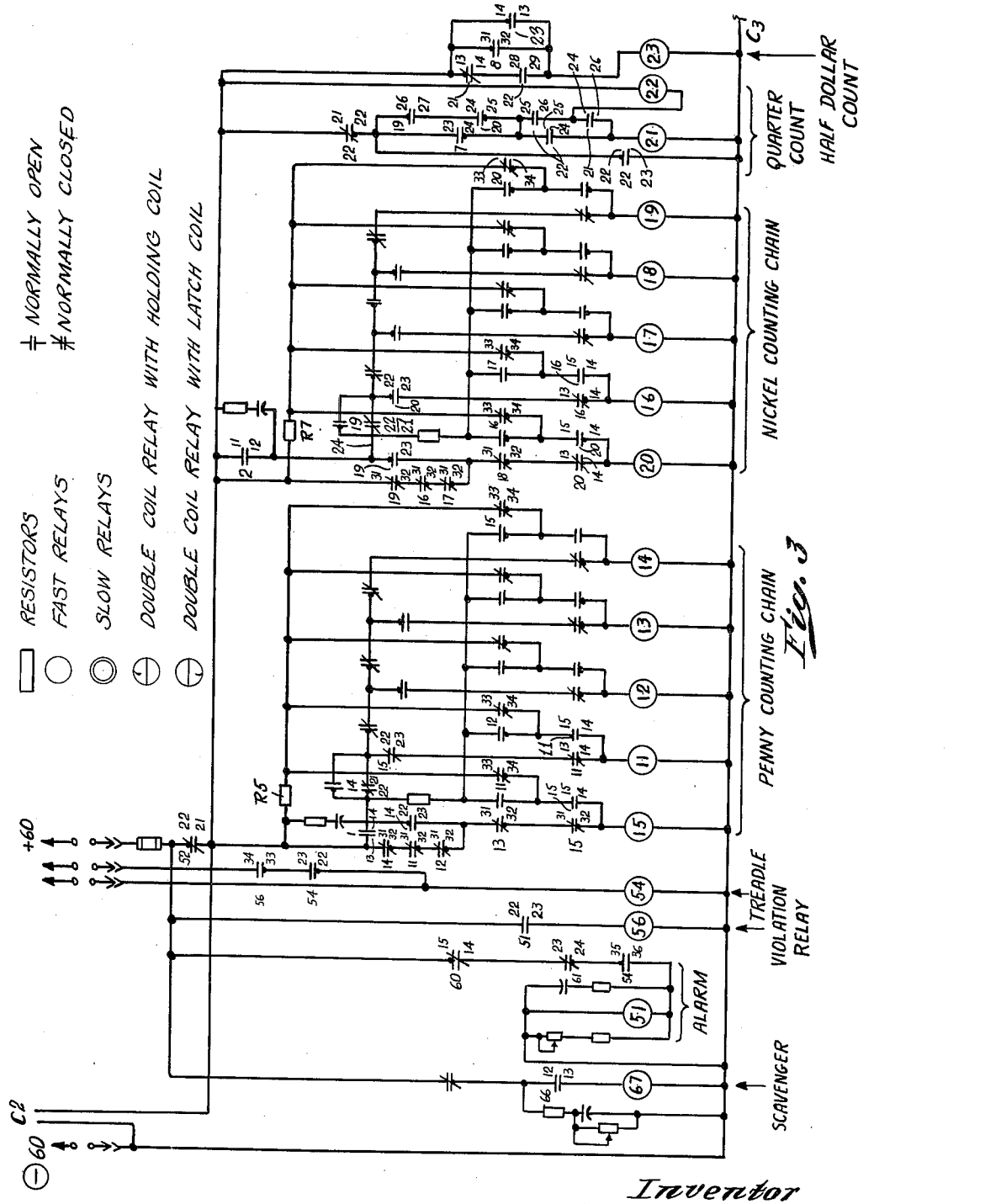

The fare receiving and recording apparatus is of the kind disclosed in Patent Nos. 2,816,639, December 17, 1957, 2,848,158, August 19, 1958, and 2,805,746, September 10, 1957, and as therein described, each coin is identified therein according to its diameter. In said apparatus, the measuring or gauging means closes different circuits for different denominations of coins, to wit, one circuit for pennies, another for nickels, another for quarters and another for half-dollars. The circuits of the coin receiving and registering apparatus are employed herein in combination with relays, which will now be described, to produce a fare-paid signal when a deposit made in the apparatus corresponds to that which is required of the particular vehicle. Since the toll may be made up of a single coin or mixed coins the system includes means for adding the coins of a deposit and, if they correspond to the required toll, initiating operation of a succession of relays which will result in signifying to the operator that he may proceed, and then restoring the system to its initial condition in readiness for the next vehicle. Referring to the wiring diagram (FIG. 3), there are shown four counting chains appropriately labeled for counting respectively, pennies, nickels and dimes, quarters and half-dollars, which when satisfied will produce a fare-paid signal. The penny counting chain operates to count five pennies and to add this in the form of a single count to the nickel counting chain. The nickel counting chain in like manner will count five nickels and transfer them as a single count to the quarter chain and the quarter counting chain will count two quarters and transfer them as a unit to the half-dollar chain. Dimes are counted on the nickel chain as two nickels. This is accomplished through the coin registering apparatus which produces two impulses for a dime and a single impulse for a nickel. The counting chains are in circuit with four relays marked 1, 2, 7 and 8 (FIG. 4) and each time one of these relays is operated a pulse will be sent through the counting chain of which it is a part. Thus relay 1 which is energized by a penny being gauged in the meter will send a pulse to the penny counting chain. Relay 2 which will be energized by a nickel gauged in the machine will send a pulse to the nickel counting chain and successively relays 7 and 8 will send pulses to the quarter and half-dollar counting chains.

In the following description, in the interest of brevity, any expression such, for example, as 52 (22-21), is to be understood as meaning a relay actuated switch, the numeral outside the parentheses designating the actuating relay and the numerals inside the parentheses indicating the poles of the particular switch. The symbols used in the wiring diagram of FIGS. 3, 4, 5 and 6, are shown at the top of the sheet containing FIG. 3, labeled for identification.

Referring now more specifically to the several counting chains. When the system is not in use relay 15 (FIG. 3) is unenergized, however, there is an unbroken circuit (FIG. 3) from plus 60 to minus 60 by way of normally closed 52 (22-21), normally closed 14 (31-32), normally closed 11 (31-32), normally closed 12 (31-32), normally closed 13 (31-32) and normally closed 15 (31-32). The instant the current is supplied to the system, for example by throwing a master switch, relay 15 energizes through the aforesaid circuit and operates to close normally open 15 (15-14) and to open normally closed 15 (31-32). Closing of normally open 15 (15-14) provides a path through normally closed 11 (33-34), R5 and normally closed 52 (22-21) to plus 60 and to hold relay 15 up. A single penny pulse operates relay 1 (FIG. 4) to close normally open 1 (13-14) and thereby to provide a path through normally closed 14 (22-21), now closed 15 (22-23), normally closed 11 (13-14) to relay 11. The instant the relay 11 is energized normally closed 11 (13-14) is open, normally closed 11 (33-34) is open and normally open 11 (15-14) is closed. Opening normally closed 11 (33-34) drops relay 15, holding it de-energized, closing 15 (31-32) and opening 15 (15-14), and locks up relay 11 through the now closed 11 (15-14), normally closed 12 (33-34), R5 and normally closed 52 (22-21) to plus 60. In succession a second penny pulse energizes relay 12, locks it up and drops relay 11, a third penny energizes relay 13, locks it up and drops relay 12, and a fourth penny energizes relay 14, locks it up and drops relay 13. Energization of relay 14 also closes normally open 14 (22-23). When the fifth penny pulse comes in it passes through now closed 14 (22-23), normally closed 13 (31-32), and normally closed 15 (31-32) to re-energize relay 15. At the same time relay 2 (FIG. 4) energizes through normally closed 13 (11-12), through 14 (28-29), which was closed by energization of relay 14 and now closed 1 (22-21). This consequently locks up relay 15 for another counting series and drops relay 14 by opening of normally closed 15 (31-32).

In like manner before the master switch is closed, relay 20 is unenergized; however, there is an unbroken circuit from plus 60 to minus 60 by way of normally closed 52 (22-21), normally closed 19 (31-32), normally closed 16 (31-32), normally closed 17 (31-32), normally closed 18 (31-32), and normally closed 20 (13-14). The instant the current is supplied, relay 20 is energized through the aforesaid contacts, and operates to close 20 (15-14) and to open 20 (13-14). Closing 20 (15-14) provides a path through now closed 16 (33-34), R7 and normally closed 52 (22-21) to plus 60 to hold relay 20 up. Energization of relay 2, either by a fifth penny, by a five cent piece or by a dime, closes 2 (11-12), so that a path is provided from normally now closed 52 (22-21) through closed 2 (11-12), normally closed 19 (22-21), now closed 20 (22-23) and normally closed 16 (13-14) to relay 16. The instant relay 16 is energized 16 (13-14) is opened, normally closed 16 (33-34) is opened and normally open 16 (15-14) is closed. Opening normally closed 16 (33-34) drops relay 20, holding it de-energized and locks up relay 16 through now closed 16 (15-14), normally closed 17 (33–34), R7 and normally closed 52 (22–21) to plus 60. In succession a second nickel energizes relay 17, locks it up and drops relay 16, a third nickel energizes relay 18, locks it up and drops relay 17, a fourth nickel energizes relay 19, locks it up and drops relay 18. Energization of relay 18 also closes 19 (24–23) and normally open 19 (26–27). Accordingly, when the pulse from the fifth nickel comes in it passes through now closed 19 (24–23), normally closed 18 (21–32) and normally closed 20 (13–14) to re-energize relay 20 and at the same time to provide a path from plus 60 to minus 60 through normally closed 52 (22–21), normally closed 22 (21–22), now closed 19 (26–27), now closed 20 (24–25), normally closed 22 (25–24) to relay 21. When relay 20 becomes energized normally closed 20 (13–14) opens and normally open 20 (15–14) is closed to lock up relay 20. Simultaneously normally closed 20 (33–34) opens to drop relay 19 so that the nickel chain is ready for the next count.

Energization of relay 21 by way of the fifth nickel or by a quarter closes relay 7 (FIG. 4), operates to close normally open 21 (24–26) and to open 21 (13–14). This provides a path through normally open 21 (24–26) and relay 22 to normally closed 52 (22–21) which operates to energize relay 22. Energization of relay 22 closes 22 (25–26) and opens 22 (25–24). Relay 21 is held up by closed 21 (24–26) through relay 22. On the second pulse of relay 7, however, relay 21 is de-energized due to placing both of its coils across minus 60 through now closed 7 (23–24) and now closed 22 (22–23) by way of now closed 21 (24–26). Relay 22 continues to hold up until the pulse stops and then drops by the opening of closed 7 (23–24).

The quarter counts are transferred to the half-dollar chain as follows. The first quarter opens the normally closed 21 (13–14) so that no current flows to relay 23, the second quarter closes 21 (13–14) and closes normally open 22 (28–29), so as to provide a current path through relay 23. Relay 23 when energized closes normally open 23 (14–13), locking it up before it is dropped by the dropping of relay 22. If a second quarter piece is deposited, relay 8 is energized which in turn closes normally open 8 (31–32), thereby energizing relay 23 and locking it up through normally open 23 (14–13).

Having provided means for counting the deposited toll and converting it into a fare-paid signal, it is desirable to indicate to the driver of the vehicle that the fare has been paid and to signify that he is to proceed. Accordingly, there is located beyond the station (FIGS. 1 and 2), in the direction of travel, an indicator 130, preferably in the form of "stop" and "go" lights, which normally displays a "stop" light, but which will be changed from "stop" to "go" by a fare-paid signal. As the vehicle leaves the station it is desirable to change the "go" signal back to "stop" so that the next vehicle will stop and make its deposit before it proceeds. Conveniently, this is effected by placing a treadle 132 (FIGS. 1 and 2) in the road, which is operated by the vehicle as it passes over it to bring about the change from "go" to "stop." The treadle is preferably so located that when the vehicle passes over it the operator is out of the line of sight of the signals so that he will not be confused by the change. To this end the treadle is usually placed beyond the signal, although it may be placed between the registering apparatus and the signal, as shown in dotted lines.

When there is a heavy flow of traffic two vehicles may be so close to each other that before the first vehicle passes over the treadle so as to turn the light back to "stop" the second vehicle will have arrived at the station and deposited the correct toll. Before the second vehicle reaches the treadle however the preceding vehicle will have passed over it and turned the signal to "stop," except for the employment of the device now to be described. The following vehicle will have a "stop" signal against it even though the toll has been paid and if it passed over the treadle a violation alarm will be produced. Accordingly, memory means, comprising a counting chain is provided which will store up two successive fare-paid signals so that if the foregoing circumstances occur, both vehicles will be permitted to pass before the signal changes from "go" back to "stop." This is effected by relays 60, 61 and 62 (FIG. 5), as follows, through the energization of relay 52.

The relay 52 is energized by the payment of a single fare and may be preconditioned to respond to a fare of a given amount by a fare strapping arrangement, wherein there are a plurality of jacks which may be inserted into sockets to connect one of the several circuits to the positive 60 and the other to the negative 60. In each strapping circuit there is a contact which is closed in response to the energization of one of the relays 2, 7, 8, 16, 17, 18, 19, 21 and 22. The jacks and sockets of the several strapping circuits are concealed in a locked receptacle so that after the circuit is strapped for a given fare it cannot be tampered with by an attendant. As herein shown, the strapping is set up for a fifty cent fare in which relay 8 is actuated to close 8 (34–32), so that one of the straps is connected by line L6 and M8 to the negative 60 and the other by L3 and M4 through the relay 52 to the positive 60. Thus when relay 8 is energized 8 (34–32) is closed to energize relay 52. Energizing 52 opens 52 (22–21) (FIG. 3) to reset the counting chains to the zero position and at the same time closes 52 (15–16) to hold up relay 52 through one of the contacts 1 (11–12) (FIG. 5), 2 (13–14), 7 (11–12) and 8 (11–12), depending upon which one of these contacts is closed. In the example given, since relay 8 was energized, 8 (11–12) will be closed and relay 52 will be held up through this contact. Referring to the strapping, by their contacts, energization of relay 2 by deposit of a five cent piece closes 2 (34–32) and if this has been connected by suitable jacks relay 52 will be energized. Energization of relay 7 by a twenty-five cent piece will close 7 (14–13). Energization of relay 8 will close 8 (34–32) for a fifty cent piece. Energization of relay 16 by a deposit of five pennies will close 16 (11–12). Energization of relay 16 by a five cent piece will close 16 (29–28). Energization of relay 17 will close 17 (11–12) or 17 (29–28), depending upon whether two nickels have been deposited or one dime. Energization of relay 18 will close 18 (11–12) or 18 (27–26), depending upon whether three nickels have been deposited or a nickel and a dime. Energization of relay 19 upon a deposit of four nickels will close 19 (12–11). Energization of relay 21 will close 21 (11–12) or 21 (29–28), depending upon whether five nickels have been deposited or a quarter. Energization of relay 22 by deposit of two quarters will close 22 (27–26). Thus, it is apparent that by choosing the suitable strapping, the relay 52 may be caused to respond to the payment of a particular fare.

Energization of relay 52 (FIG. 6) closes open 52 (13–14) and 52 (31–32) of the fare-paid counting chain (FIG. 5). Closing of 52 (13–14) provides a current path through normally closed 60 (32–31) and normally closed 62 (21–22) to relay 61, from the 60 plus. Relay 52, which has a very slow operating coil, then drops, however, relay 61 locks up through normally open 61 (14–15) which is closed by the energization of relay 61, normally closed 62 (24–23) through the operating coil of a double coil relay 60–60 and normally closed 60 (21–22) to the positive. Relay 60–60 opens normally closed 60 (21–22) but prior thereto closes normally open 60 (23–22) so that it becomes locked up through normally closed 43 (11–12), normally closed 73 (21–22) and now closed 60 (23–22). On the second fare-paid signal relay 62 is energized through normally open 52 (13–14) which is temporarily closed by relay 52 and normally open 60 (32–33), which is closed by energization of relay 60–60. Energization of relay 62 closes normally open 62 (14–15) and since normally open 60 (23–22) has been closed by energization of relay 60–60, relay 62 is held up. Relay 62, however, is held only momentarily by 60 (23–22), since the operation of relay 62 opens normally closed 62 (24–23), so that relay 60–60 is dropped. Dropping of the holding coil of relay 60–60 results in the closing of 60 (21–22) and opening of 60 (23–22). Since 60 (21–22) closes before 60 (23–22) opens, relay 62 continues to be held up through closed 62 (14–15), normally closed 73 (22–21), normally closed 43 (12–11) and now closed 60 (21–22). When relay 60–60 drops, relay 61 transfers its holding circuit through now closed 62 (24–25) and a resistor to the positive battery. There are now two fare-paid signals stored in the circuit. The contact 43 (11–12) which is normally closed is opened each time the second axle of a car is counted on a counting chain, which will be described hereinafter. When the second axle of the first car opens 43 (11–12), relay 62 drops due to the positive battery being shunted out of the holding line for relay 62 by way of normally closed 60 (22–21), normally closed 43 (11–12), normally closed 73 (21–22) and closed 62 (15–14), so that the relay 62 is connected at both sides to the negative side of the circuit. Simultaneously relay 60–60 is re-energized through normally closed 60 (22–21); however, 62 (25–24) has closed so that 61 is held up. When the second axle of the second vehicle opens 43 (11–12), relay 60–60 is dropped and thereby opens 60 (22–21) and drops relay 61.

The placing of the toll paid counts on relays 60–60, 61 and 62 operates through relays 71, 72 and 73 (FIG. 4) to change the indicator signal light from stop to go and the latter will remain at go until the aforesaid treadle 132 is operated by a vehicle departing from the station.

Referring to relays 71, 72 and 73 (FIG. 4), when relay 61 is energized, as previously explained, by payment of one fare, relay 62 (12–13) of the fare cancellation chain containing relays 71, 72 and 73 is closed, which supplies current from the positive 60 through B3 to the signal 130 to change the latter from red to green, thereby to indicate to the driver that he may proceed. If no second fare is paid before the vehicle passes over the treadle 132, relay 62 will be dropped by operation of the treadle and 62 (12–13) will then be opened to change the signal 130 back to red. If, however, a second fare has been deposited relay 62 will have been energized which in turn closes 62 (12–13). By closing 62 (12–13) relay 72 is energized. Relay 72 when energized closes 72 (11–12), which supplies current to relay 71 to energize it. Relay 72 (33–32) is also closed so as to lock relay 72 up. If the first vehicle crosses the treadle 132 without paying a fare but is apprehended and the driver then gets out of the vehicle and pays the fare the signal will of course, change from red to green. However, since he is beyond the treadle 132 he does not cross it when he leaves and hence he does not turn the signal from green back to red. Consequently, the next vehicle paying a fare will merely add a second fare to the fare-paid chain so as to energize relay 72. Hence when he crosses the treadle he merely cancels out the second fare but the light stays green and will continue to stay green until some following vehicle crosses the treadle without paying. It is the purpose of relay 71 to return the signal from green to red to avoid this condition after a predetermined length of time. Relay 71 is therefore set to close after a delay of a predetermined time, selected according to the conditions existing where the system is installed. When relay 71 is energized, 71 (12–13) is closed, thereby energizing relay 73. This in turn opens 73 (21–22) (FIG. 5), thereby to drop relay 62, hence the following vehicle passing over the treadle will turn the signal from green to red. It may happen that a vehicle, not allowed, may attempt to pass through the station or that through wrong classification a vehicle may have more axles than is permitted for a given toll. Hence it is desirable not only that the treadle operate through the axle counting chain to turn the signal from go to stop to condition the system for the next vehicle, but that means be provided for counting the number of axles and the number of violations so that they may be checked against the toll paid.

Figure 4:
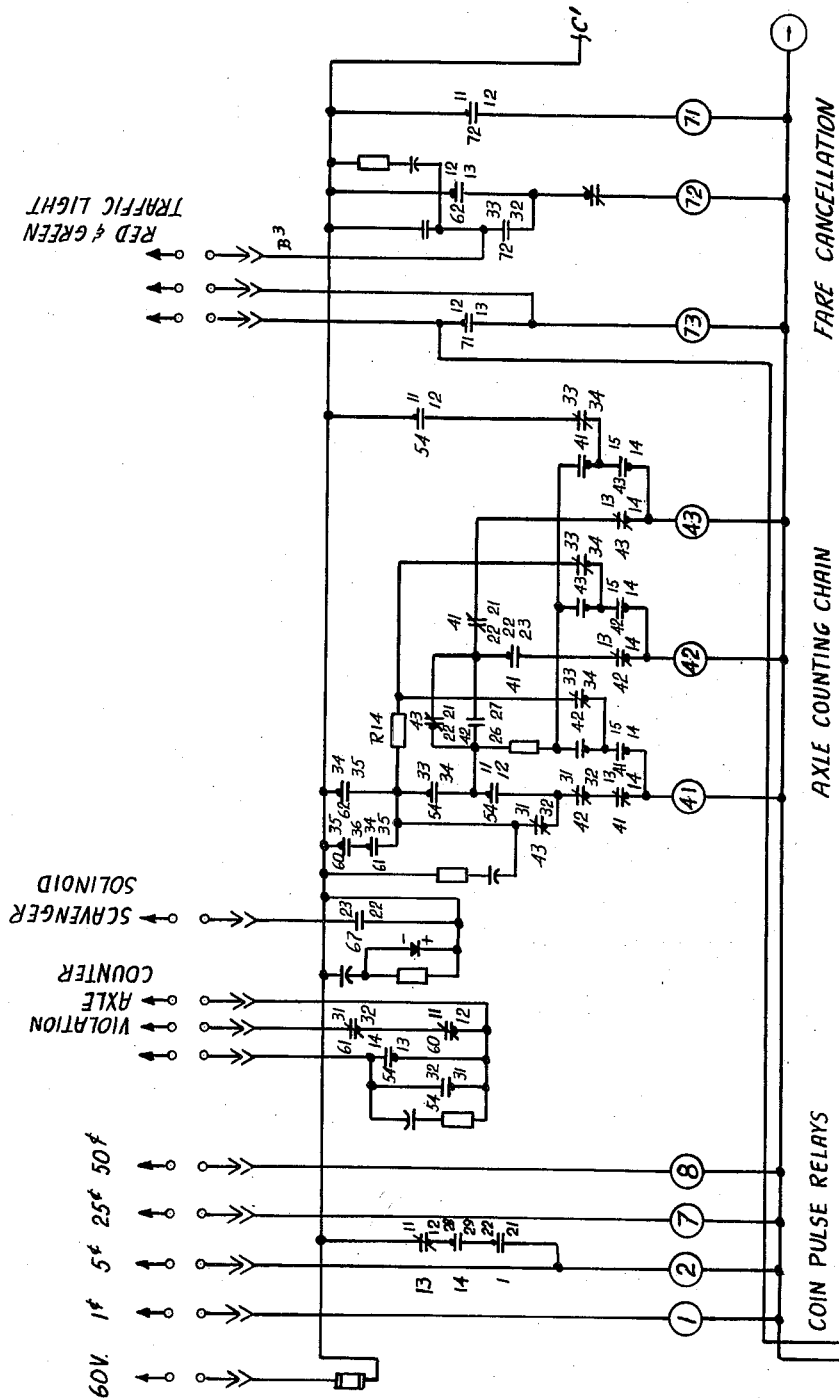

The axle counting chain (FIG. 4) contains relay 43, which operates contact 43 (11–12) (FIG. 5) to restore the fare-paid counting chain to its initial position, is part of a circuit containing relays 41, 42 and 43. Referring to this circuit (FIG. 4), when the relays 60 and 61 of the fare-paid counting chain are energized, due to the payment of a correct fare, they close respectively, normally open contacts 60 (35–36) (FIG. 4) and 61 (34–35). This establishes a circuit through now closed 60 (35–36) and 61 (34–35), normally closed 43 (31–32), normally closed 42 (31–32), normally closed 41 (13–14) to relay 41. Energization of relay 41 opens 41 (13–14), but not before closing 41 (14–15) so that relay 41 becomes locked up through now closed 41 (14–14), normally closed 42 (33–34), R14, 61 (35–34) and 60 (36–35) to the positive. If there are two fares paid on the fare-paid counting chain, relay 62 (34–35) would be closed and the circuit would be established through now closed 62 (34–35), normally closed 43 (31–32), normally closed 42 (31–32), normally closed 41 (13–14) to relay 41 to energize the same, whereupon it would lock up, as previously explained, through now closed 41 (14–15), normally closed 42 (33–34), R14 and 62 (35–34) to the positive. 60 (35–36) and 61 (34–35) will be open. If now the proper number of axles for the amount of fare-paid is registered, the fare-paid counting chain would be returned to its zero position by actuation of relay 43 and the "go" traffic light would be returned to "stop" by opening of 62 (12–13). On passage of the first vehicle over the treadle 132 in the highway, relay 54 will be energized which closes normally open 54 (33–34) (FIG. 3) and normally open 54 (11–12) (FIG. 4). Closing 54 (33–34) provides a closed path through 60 (35–36), 61 (34–35), 54 (33–34), 43 (22–21), 41 (22–23) and 52 (13–14) to relay 42, thereby energizing the same. Energization of relay 42 opens 42 (13–14) but closes 42 (15–14) ahead of it so that relay 42 is held up through 42 (15–14), normally closed 43 (33–34) and R14 to the positive. At the same time normally closed 42 (33–34) is open so that relay 41 is dropped. When the second axle of the first car again closes 54 (33–34), a circuit is completed therethrough and through now closed 42 (26–27) and normally closed 41 (22–21), normally closed 43 (13–14) to relay 43, so as to close the same. Energization of relay 43 pulls 43 (13–14) open but not before 43 (15–14) is closed, which holds up relay 43 through normally closed 41 (33–34), and closed 54 (11–12) long enough to open normally closed 43 (11–12), thereby to drop relay 61 and hence open 60 (35–36) and 61 (34–35). If there has been a second fare-paid, when relay 43 drops, relay 41 will be re-energized through 60 (35–36) and 61 (34–35), 43 (31–32), 42 (31–32) and 41 (13–14). The passing of the first axle of the second car will, as previously explained, energize relay 42 and drop 41 while its second axle energizes relay 43 and drops 42. The second energization of relay 43 will again actuate 43 (11–12) to drop relays 60–60 and 61, so that the axle counting chain is now ready for another count.

Sometimes an insufficient amount of toll is paid or a vehicle tries to sneak through without paying at all.

If an improper toll was paid or none at all, relays 60–60 and 61 will, of course, be unenergized. Hence when relay 54 is energized by passing of the vehicle over the treadle contacts 54 (35–36) will be closed and current will then pass through 60 (15–14) and 61 (23–24). Relay 51, when energized, closes contact 51 (22–23) so as to energize violation relay 56. Energization of violation relay 56 closes normally open 56 (31–32) of an alarm circuit (FIG. 5) and scavenger control. Thus closing of 56 (31–32) establishes a circuit through normally closed 65 (12–11) to relay 64. Energizing relay 64 closes 64 (12–13) so as to energize relay 65, whereupon 65 (12–11) is opened. Relay 64 remains energized through 64 (12–13). The second closing of 56 (31–32) permits current to pass through the now closed 65 (12–13) to relay 66 to energize the same. Energization of relay 66 closes 66 (12–13) so as to energize relay 67 (FIG. 3), which closes 67 (23–22) (FIG. 4), supplying current to the solenoid which allows the scavenger door of the coin machine to open. Relay 66 drops when 56 (31–32) opens and this in turn opens when relay 56 is dropped. Relays 64 and 65 are dropped when relay 61 is energized so as to move 61 (22–21) to an open position. The scavenger door is normally held closed by the solenoid so that in the event of failure of the electric power or jamming of the coin machine, the scavenger door will stand open and allow all deposits made thereafter to pass through into the vault.

The reason for permitting the scavenger door to open only after the second consecutive violation signal is that a single violation is quite likely to be the result of no fare having been paid or an insufficient fare. It is not desirable, if such is the case, to open the scavenger door because the good coins would be discharged into the vault with the bad coins and trash. When the violation occurs the second time however it is a pretty good indication that the difficulty is in the registering apparatus itself by reason of the presence of bent coins, slugs and the like, and hence it is desirable to open the scavenger door and dump these into the vault.

The energization of relay 52 provides a convenient means for operating a signal bell to indicate that a fare of the proper amount has been paid. To this end (FIG. 6), 52 (34–33), 52 (12–11), 52 (25–24), 52 (27–26) and 52 (29–28) are closed by relay 52 to supply current through suitable fare-paid leads with which they are associated to sound the bell or other audible signal.

Relay 52 also closes 52 (38–37), each time it is energized, so as to operate a counting mechanism for counting the total number of fares paid. At the same time 52 (36–35) is closed to energize a counter which records the number of vehicles and transactions which take place and to transmit this number to an administration building.

The energization of relay 56 provides convenient means for operating alarm signals. To this end 56 (22–21) and 56 (24–23) are closed by relay 56 to supply current through suitable alarm leads within which they are located to an alarm bell.

Energization of relays 2, 7 and 8 provides convenient means for recording the number of coins of a given denomination deposited. To this end relay 2 closes 2 (22–21) (FIG. 6) to count five cent pieces or 2 (34–33) (FIG. 5) to count ten cent pieces, relay 7 to close 7 (34–33) (FIG. 6) to count twenty-five cent pieces, 7 (32–31) to count twenty-five cents in cash, relay 8 to close 8 (22–21) and count fifty cent pieces and relay 8 (24–23) to count fifty cents in small change.

Energization of relays 11, 12, 13, 14, 15, 16, 17, 18, 19, 20, 21, 22 and 23 provides means for indicating on the sign 126 what fare has been paid by the driver of the vehicle. To this end these relays close 11 (25–24), 12 (25–24), 13 (25–24), up to and including 23 (25–24).

Energization of relay 54 (FIG. 4) closes 54 (14–13) and 54 (32–31) so that every axle that passes is counted. 60 (11–12) and 61 (31–32) are closed when relays 60–60 and 61 are not engaged and that condition exists when no fare has been paid. Accordingly, each time the relay 54 is closed, a violation axle will be counted. The contacts 60 (11–12) and 61 (31–32) will be held open by payment of the fare and hence will not count axles properly passing over the treadle and operating relay 54. A counter may be connected to the treadle relay 54, so as to count every other depression and hence to count the number of vehicles. By comparing the number of vehicles counted on this counter with the number of transactions it is possible to check two against each other.

The several wiring diagrams shown in FIGS. 3 to 6 inclusive, are connected at the places which have corresponding reference characters.

It should be understood that the present disclosure is for the purpose of illustration only and that this invention includes all modifications and equivalents which fall within the scope of the appended claims.

I claim:

1. At a toll collecting station, means responsive to a deposit of coins equalling or exceeding the prescribed toll to give a fare-paid signal, a "stop" and "go" indicator normally exhibiting a "stop" signal, means responsive to the fare-paid signal, signifying that a vehicle, whose fare has been paid, may proceed, signal reversing means normally operable by said vehicle as it leaves the station, to cause the signal to return to "stop," and means operative, in the event that the deposit of the prescribed fare by a second vehicle is made prior to the actuation of the signal reversing means by the first-named vehicle, to maintain the indicator at the "go" position until said second fare-paying vehicle leaves the station.

2. At a toll collecting station, means responsive to a deposit of coins equalling or exceeding the prescribed toll to give a fare-paid signal, and a memory device capable of accumulating successive fare-paid signals, a "stop" and "go" indicator normally exhibiting a "stop" signal, means normally operable, in response to storage of a single fare-paid signal by the memory device, to change the indicator signal from "stop" to "go," signal reversing means, normally responsive to the departure of a vehicle from the station to change the indicator signal from "go" to "stop," and means operable, by the response of said memory device to the reception of a second fare-paid signal before the signal reversing means is operated by a departing vehicle, to render the signal reversing means temporarily ineffective.

3. At a toll collecting station, means responsive to a deposit of coins equalling or exceeding the prescribed toll, to give a fare-paid signal, a memory device capable of accumulating two successive fare-paid signals, a "stop" and "go" indicator normally exhibiting a "stop" signal, means operable in response to the storage of a single fare-paid signal by the memory device to change the indicator signal from "stop" to "go," signal reversing means normally responsive to the departure of a vehicle from the station to change the indicator signal from "go" to "stop," means conditionable by said memory device, in the event of the occurrence of a second fare-paid signal before the signal reversing means is operated by said departing vehicle, to render the signal reversing means temporarily ineffective, and means automatically operable, at the end of a predetermined period of time, after the memory device has received the second fare-paid signal, to cancel the latter signal from the memory device.

4. At a toll collecting station, means responsive to a deposit of coins equalling or exceeding the prescribed toll to give a fare-paid signal, memory means operative to accumulate two successive fare-paid signals, an indicator normally exhibiting a "stop" signal, said indicator signal being normally changed from "stop" to "go" upon the reception, by the memory means, of a first fare-paid signal, a treadle normally operable, by the departure from the station of a toll-paying vehicle, to change the indicator signal from "go" to "stop," and means operable by said memory means, in response to the reception thereby of a second fare-paid signal before the first fare-paid signal is cancelled from the memory device by said first vehicle in passing over the treadle, to condition the treadle-operated means, so that it will change the indicator signal from "go" to "stop" only in response to the passage of two toll-paying vehicles over the treadle in succession.

5. In a toll collecting system, means responsive to a deposit of coins equalling or exceeding the prescribed toll to give a fare-paid signal, memory means capable of accumulating successive fare-paid signals, an indicator normally exhibiting a "stop" signal, signal reversing means operable, in response to the storage of a first fare-paid signal by the memory device to change the signal from "stop" to "go," an axle counter normally operable to cancel said fare-paid signal from the memory means thereby to cause the indicator to change from "go" to "stop" when a vehicle leaves the station, and means operable by said memory means, upon reception of a second fare-paid signal before the first fare-paid signal has been cancelled from the memory means and before the indicator signal has been changed from "go" to "stop," to render the signal reversing means ineffective until the axle counter means has been operated by two vehicles in succession.

6. At a toll collecting station, means responsive to a deposit of coins equalling or exceeding the prescribed toll to give a fare-paid signal, memory means operable to store up a plurality of successive fare-paid signals, an indicator which normally exhibits a "stop" signal, means whereby said indicator normally changes from "stop" to "go" in response to the storage of a single fare-paid signal by the memory means, axle counter means normally operable by the passage of the vehicle in leaving the station to cancel the first stored fare-paid signal from the memory device and thereby cause the indicator to return to "stop," and means operative by the axle counter means, if a second fare-paid signal is stored before cancellation of the first fare-paid signal is effected, to cancel the second fare-paid signal but only in response to the operation of the axle counter means by two vehicles in succession.

7. In a toll collecting system, means responsive to a deposit of coins equalling or exceeding the prescribed toll to give a fare-paid signal, a "stop" and "go" indicator normally exhibiting a "stop" signal, signal reversing means normally responsive to the fare-paid signal to cause the indicator to exhibit the "go" signal, signifying that the vehicle, whose fare has been paid, may proceed, memory means operative to store up a plurality of successive fare-paid signals, an indicator which normally exhibits a "stop" signal, means whereby said indicator normally changes from "stop" to "go" in response to the storage of a single fare-paid signal by the memory means, axle counter means normally operative by the passage of a vehicle to cancel said first stored fare-paid signal from the memory means, and thereby cause the indicator to return to "stop," and means operative by the axle counter if a second fare-paid signal is stored by the memory device before cancellation of the first fare-paid signal is effected, to cancel the second stored fare-paid signal from the memory device but only in response to the passage of two vehicles in succession.

8. At a toll collecting station, means responsive to a deposit of coins equalling or exceeding the prescribed toll to give a fare-paid signal, a "stop" and "go" indicator normally exhibiting a "stop" signal, means normally responsive to the fare-paid signal to cause the indicator to change from "stop" to "go," signifying that a vehicle, whose fare has been paid, may proceed, vehicle-sensing means normally operable, by said vehicle as it leaves the station, to change the indicator from "go" to "stop," and means operative, by a deposit equalling or exceeding the prescribed amount by a following vehicle before said vehicle effects the operation of said vehicle-sensing means, to render operation of said vehicle-sensing means ineffective until actuated by two vehicles in succession.

9. At a toll collecting station, means for storing up two fares in succession, said means being responsive to the deposit of each fare to give a fare-paid signal, a "stop" and "go" indicator normally exhibiting a "stop" signal, means normally responsive to a fare-paid signal to cause the indicator to change to "go," vehicle-actuatable means operable to change the signal from "go" to "stop," and means operable, by the storage of a second fare deposited without the vehicle-actuatable means having been actuated between successive signals, to render the vehicle-actuatable means ineffective until it is actuated by two vehicles in succession.

10. A toll collecting system according to claim 9, wherein there are other means operable, at a predetermined time following the rendering of the vehicle-actuatable means ineffective to change the signal from "go" to "stop."

11. At an automatic toll collecting station, means operative, if the value of the coins deposited equals or exceeds the prescribed toll, to give a fare-paid signal, a "stop" and "go" indicator normally exhibiting a "stop" signal, means normally responsive to the fare-paid signal to cause the indicator to exhibit the "go" signal, signifying that a vehicle, whose fare has been paid, may proceed, vehicle-actuatable means operable, by said vehicle, to change the indicator back to "stop" as the vehicle leaves the station, means for delaying the change from "go" to "stop," in the event that the vehicle-actuatable means fails to be actuated between deposits, until the vehicle-actuatable means has been actuated by two vehicles in succession, and means for changing the signal from "go" to "stop" at the end of a predetermined period of time following actuation of the vehicle-actuatable means by a first vehicle independently of actuation by a second vehicle.

12. An automatic toll collecting system according to claim 8, wherein the means normally operable, by said vehicle, to change the indicator from "go" back to "stop" as it leaves the station is a treadle situated beyond the station in the direction of movement of the vehicle.

13. A toll collecting system according to claim 8, having coin-receiving means, scavenging means operable to clear said coin-receiving means of spurious matter, and means responsive to each failure of the first means to respond to a deposit equalling or exceeding the prescribed toll to effect the change from "stop" to "go," to effect operation of the scavenging means.

14. A toll collecting system according to claim 8, having an alarm and means, responsive to each failure of the first means to respond to a deposit equalling or exceeding the prescribed toll to effect the change from "stop" to "go," to effect operation of the alarm.

15. In a toll collecting system wherein there is means responsive to a deposit of coins equalling or exceeding the prescribed toll to give a fare-paid signal, a "stop" and "go" indicator normally exhibiting a "stop" signal, means normally responsive to the fare-paid signal to cause the indicator to change from "stop" to "go," signifying that a vehicle, whose fare has been paid, may proceed, means normally operative, by said vehicle as it leaves the station, to change the indicator from "go" to "stop," coin-receiving means, and a power supply for effecting its operation, a scavenger door in the coin-receiving means through which coins and/or spurious material may be discharged, and means operative, so long as power is supplied to the coin-receiving means, to hold the scavenger door closed, said means being rendered inoperative, by failure of the power, to permit the scavenger door to open.

16. A toll collecting system according to claim 8 comprising means operable, by each fare-paid signal, to record the number of fares paid and hence the number of transactions.

17. A toll collecting system according to claim 8, wherein there is a counter responsive to every other operation of the first means to add a single count to its total thereby to count the number of vehicles.

18. A toll collecting system according to claim 8, comprising means operative to count and record the number of coins of any given denomination deposited.

19. A toll collecting system according to claim 8, comprising means operable, when a vehicle passes said vehicle-sensing means in the absence of a fare-paid signal, to record the violation.

References Cited in the file of this patent

UNITED STATES PATENTS

| | | |
|---|---|---|
| 2,006,433 | Bierstadt | July 2, 1935 |
| 2,594,422 | Gordon | Apr. 29, 1952 |
| 2,685,406 | Haas | Aug. 3, 1954 |
| 2,769,165 | Bower | Oct. 30, 1956 |
| 2,784,911 | Cooper | Mar. 12, 1957 |
| 2,798,664 | Grant | July 9, 1957 |
| 2,807,418 | Cunningham | Sept. 24, 1957 |
| 2,829,362 | Terrill | Apr. 1, 1958 |
| 2,848,158 | Miller | Aug. 19, 1958 |
| 2,849,701 | Clark | Aug. 26, 1958 |
| 2,881,975 | Bower | Apr. 14, 1959 |
| 2,908,895 | Cooper | Oct. 13, 1959 |
| 2,922,575 | Durant | Jan. 26, 1960 |

FOREIGN PATENTS

| | | |
|---|---|---|
| 216,304 | Great Britain | Jan. 28, 1924 |